United States Patent
Brannan et al.

(10) Patent No.: US 7,111,744 B2
(45) Date of Patent: Sep. 26, 2006

(54) CRANE MOUNT ASSEMBLY FOR UTILITY TRUCK

(75) Inventors: Jack D. Brannan, Columbia, MO (US); Robert J. Wolf, Chariton, IA (US)

(73) Assignee: Astroria Industries of Iowa, Inc., Chariton, IA (US)

( * ) Notice: Subject to any disclaimer, the term of this patent is extended or adjusted under 35 U.S.C. 154(b) by 108 days.

(21) Appl. No.: 10/408,644

(22) Filed: Apr. 7, 2003

(65) Prior Publication Data

US 2004/0195196 A1 Oct. 7, 2004

(51) Int. Cl.
*B66C 23/44* (2006.01)

(52) U.S. Cl. .................. 212/180; 212/253; 414/543

(58) Field of Classification Search ........... 212/180, 212/181, 253, 230–232, 280; 414/543; 280/797
See application file for complete search history.

(56) References Cited

U.S. PATENT DOCUMENTS

| | | | |
|---|---|---|---|
| 2,487,305 A | 11/1949 | Bridgegroom | |
| 2,496,401 A | 2/1950 | McKinney | |
| 2,638,232 A | 5/1953 | Perkins | |
| 2,653,829 A * | 9/1953 | Sheehan | 280/797 |
| 2,846,263 A * | 8/1958 | La Rue | 296/184.1 |
| 3,023,914 A | 3/1962 | McGuire | |
| 3,111,226 A | 11/1963 | Kirsten | |
| 3,426,917 A | 2/1969 | Siegel | |
| 3,533,515 A * | 10/1970 | Milner, Jr. | 212/288 |
| 3,596,976 A * | 8/1971 | Eitel et al. | 212/181 |
| 3,622,171 A * | 11/1971 | Gottschalk | 280/797 |
| 3,792,778 A | 2/1974 | Sholl et al. | |
| 3,918,742 A * | 11/1975 | Gaibler et al. | 280/764.1 |
| 3,972,571 A * | 8/1976 | Benkowski | 384/42 |
| 4,049,238 A | 9/1977 | Brown | |
| 4,059,170 A * | 11/1977 | Young | 180/54.1 |
| 4,069,922 A | 1/1978 | Hawkins | |
| 4,160,558 A * | 7/1979 | Fritsch | 280/797 |
| 4,167,278 A * | 9/1979 | Holmes | 280/786 |
| 4,276,985 A | 7/1981 | Newman | |
| 4,441,851 A * | 4/1984 | Starkweather | 414/563 |
| 4,463,858 A | 8/1984 | Bilas | |
| 4,540,095 A * | 9/1985 | Wormser et al. | 212/299 |
| 4,570,973 A * | 2/1986 | Ewers et al. | 280/800 |
| 4,643,320 A | 2/1987 | Larsen | |
| 5,281,078 A | 1/1994 | Mills, Jr. | |
| 5,368,317 A * | 11/1994 | McCombs et al. | 280/4 |
| 5,393,193 A | 2/1995 | Dagg | |
| 5,678,707 A * | 10/1997 | Stallbaumer et al. | 212/253 |

* cited by examiner

*Primary Examiner*—Thomas J. Brahan

(57) ABSTRACT

A crane mount assembly having a mounting base and tower, the base having a pair of longitudinal members in parallel spaced alignment with transverse members positioned therebetween, and a top and bottom plate secured between the longitudinal members and the transverse members to create a torsion cell. The tower includes a base plate with a plurality of side panels that extend vertically from the base plate, and a mounting plate that is secured to the top of the side panels to create a hollow chamber.

10 Claims, 3 Drawing Sheets

CRANE MOUNT ASSEMBLY FOR UTILITY TRUCK

BACKGROUND OF THE INVENTION

This invention relates to a crane mount assembly for a utility truck, and more specifically, and without limitation, to a mount assembly that provides greater support strength and rigidity for mounting a crane used in a utility truck.

Assemblies for mounting cranes for use with utility vehicles are well known within the art. Generally, these mounting assemblies include a support bracket that is secured to either the loading body of a vehicle or the chassis. As an example, and incorporated by reference herein, U.S. Pat. No. 4,463,858 by Bilas discloses a U-shaped support frame secured to a truck bed and the frame. As a further example, and incorporated by reference herein, U.S. Pat. No. 4,643,320 by Larsen discloses a crane bracket that may be mounted under the loading body and preferably in a space between the cab and the loading body. While these brackets provide for the mounting of a crane thereupon, because of their construction, the size of crane used, as well as the load to be moved by the crane are limited. When either too large of a crane is mounted or too large of a load applied, both bending and torsion forces can cause damage to the crane mount assembly.

Thus, a primary objective of the present invention is to provide a crane mount assembly that provides greater support strength for mounting a crane.

Another objective of the present invention is to provide a crane mount assembly that can withstand greater torsion and bending forces.

Another objective of the present invention is to provide a crane mount assembly for supporting larger loads.

Another objective of the present invention is to provide a crane mount assembly that allows a simple means of installing the crane.

These and other objectives, features, and advantages will become apparent from the following disclosure.

BRIEF SUMMARY OF THE INVENTION

The crane mount assembly includes a crane mount base and a crane tower. The base includes a pair of longitudinal members in spaced alignment with a plurality of transverse members positioned therebetween. A top plate and bottom plate, otherwise known as the uppermost plate and the lowermost plate, are secured between the longitudinal members and transverse members to form a torsion cell.

The crane tower includes a base plate secured to the top plate of the mount base, a plurality of side panels that extend vertically from the base plate, and a mounting plate secured to the top edge of the side panels.

DETAILED DESCRIPTION OF THE INVENTION

Figure 1:
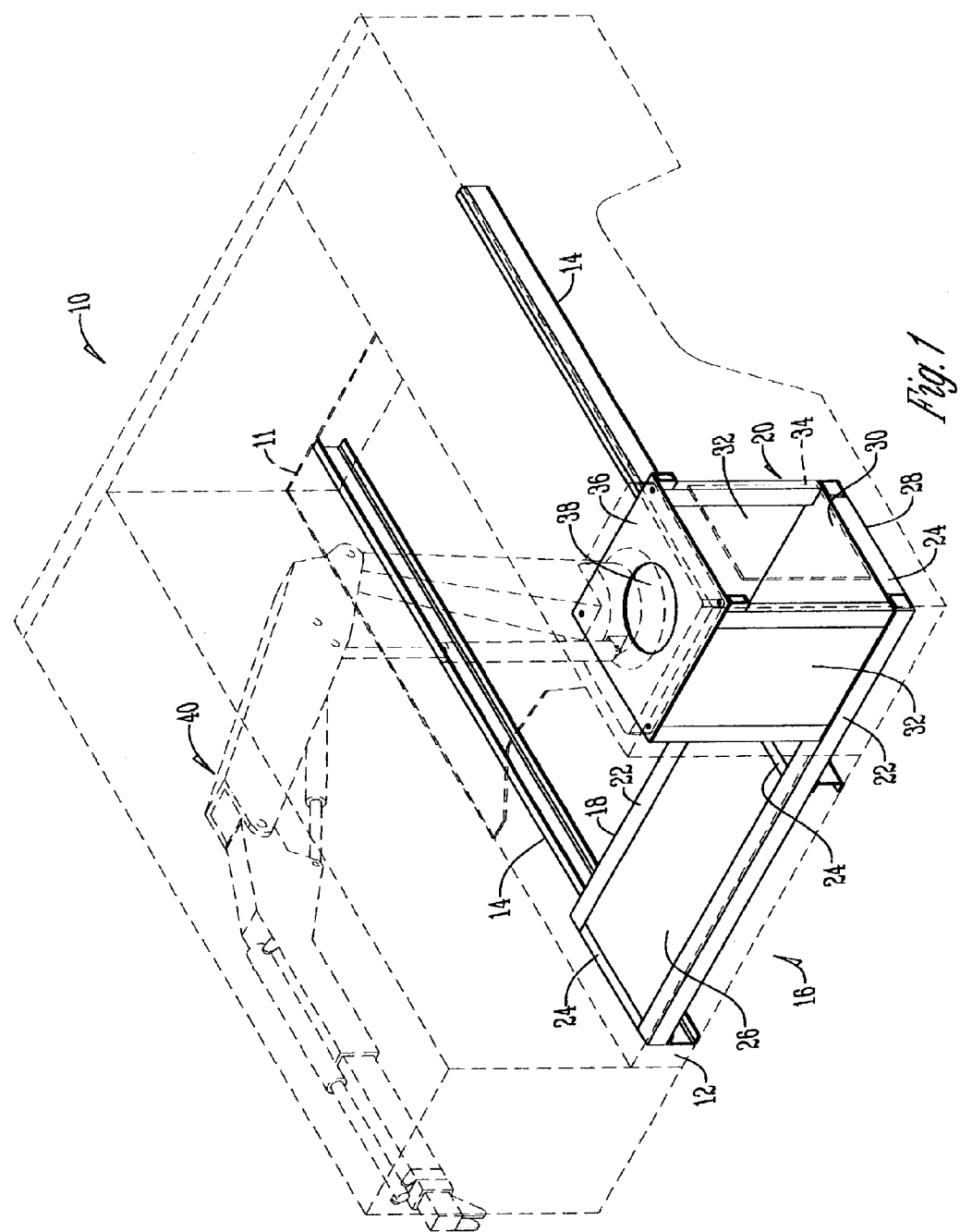
FIG. 1 is a perspective view of the crane mount assembly in a rear compartment of a truck.
Figure 2:
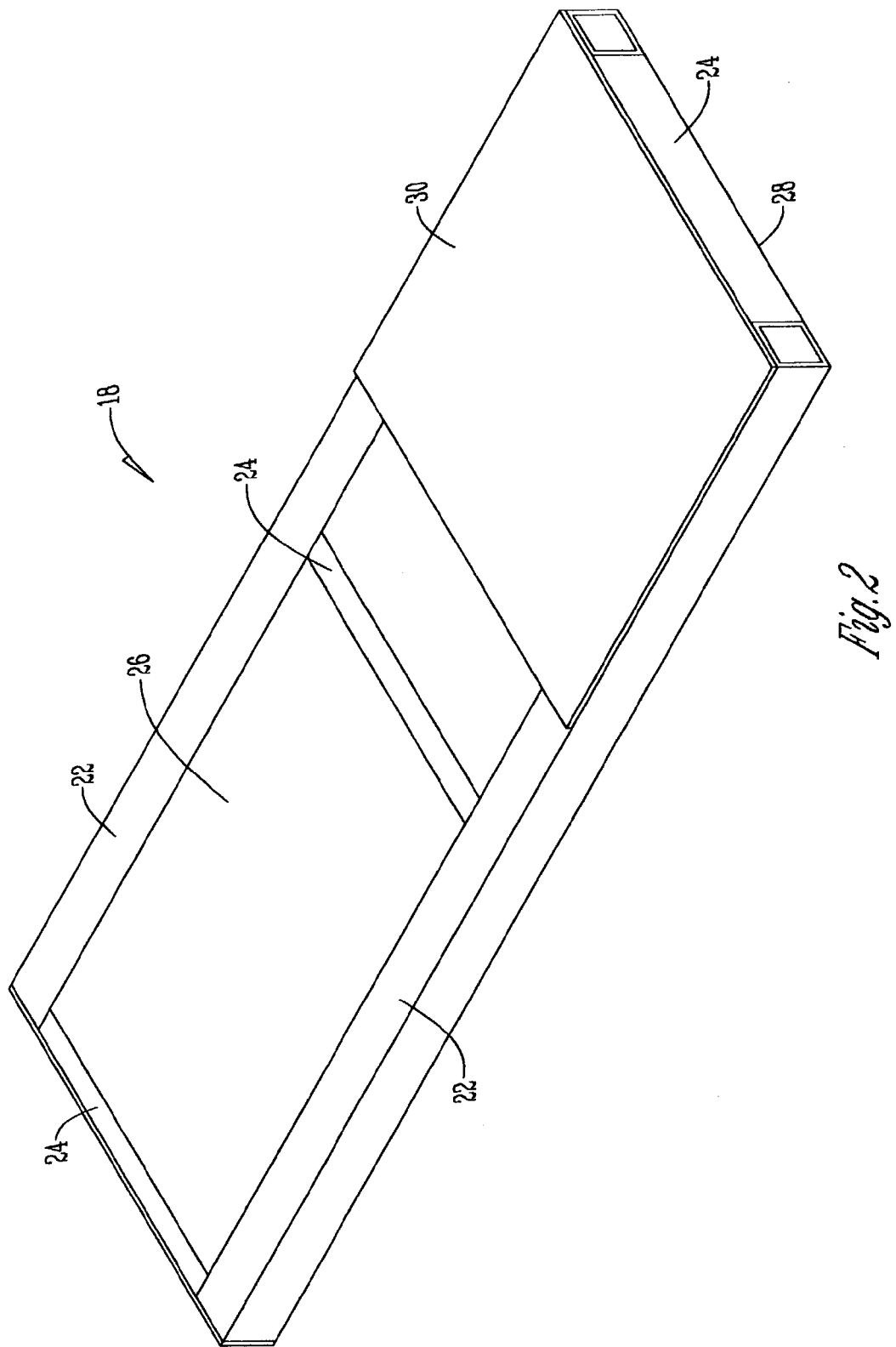
FIG. 2 is a perspective view of the crane mount base.
Figure 3:
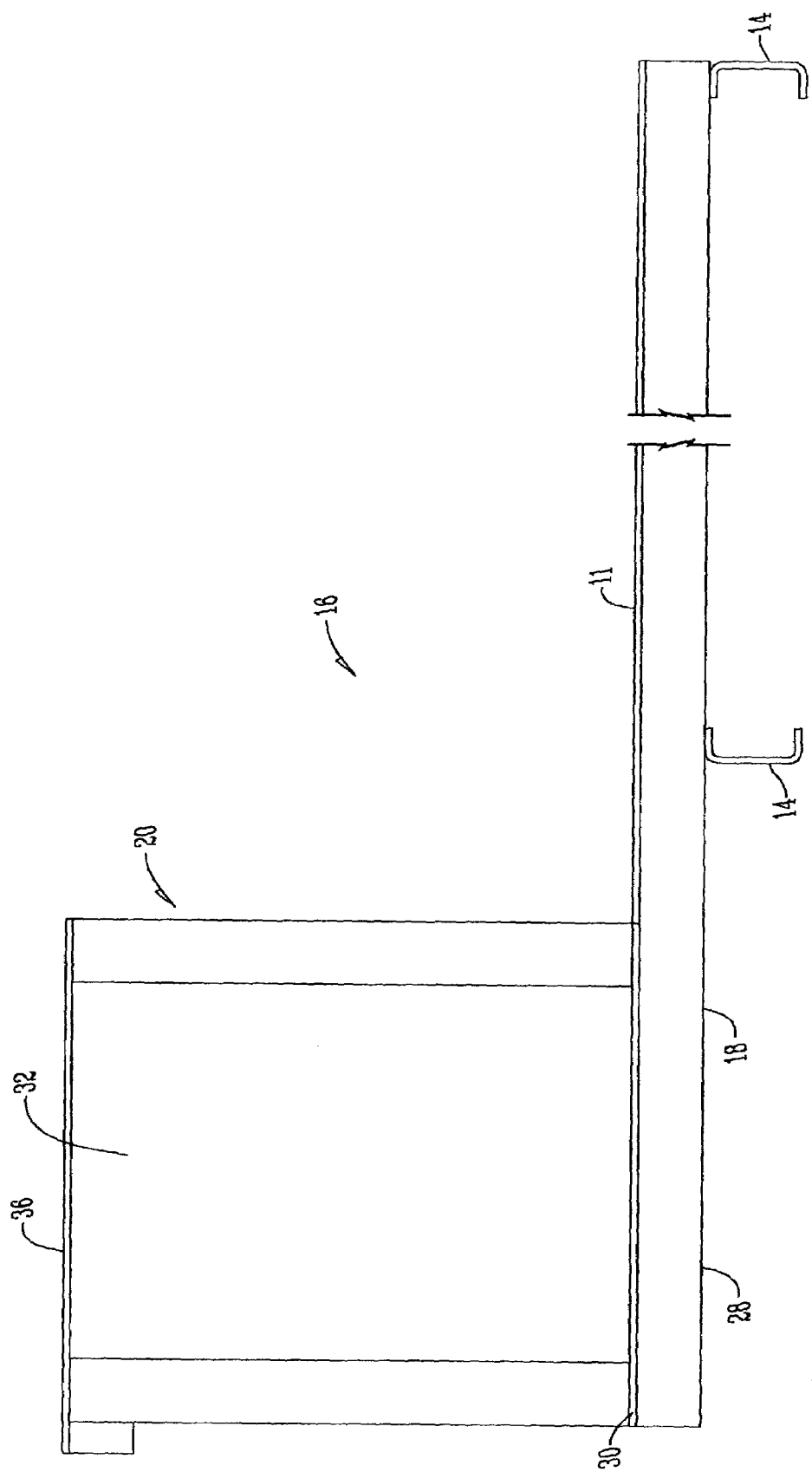
FIG. 3 is a side view of the crane mount assembly.

Referring to the drawings, the present invention is described in reference to a utility truck by example only. It is contemplated that the crane mount assembly can be used in other vehicles and structures. A conventional truck 10 has a floor plate 11 supported by a body subframe 12, otherwise known as the bed subframe that is conventionally secured to truck frame members 14 which run parallel to the longitudinal direction of the truck 10.

The crane mount assembly 16 includes a crane mount base 18 and a crane tower 20. The crane mount base has a pair of longitudinal members 22 in parallel spaced alignment that extend across and beyond the truck frame members 14. Positioned between and secured to the longitudinal members 22 by conventional means are a plurality of transverse members 24. Two of the transverse members 24 are in parallel alignment and secured to the truck frame members 14 to provide greater support for the crane mount assembly 16. The base 18 can be secured to the truck frame in any conventional manner including a weld unit.

In order to comprise the torsion cell the top surface of the top or uppermost plate 26 of the torsion cell must be located within the same horizontal plane as a top surface of the transverse members 24 and a top surface of the longitudinal members 22.

The crane mount base 18 is incorporated into the weld mount of the body such that the top plates 26 are flush with the top of the body subframe 12 and dwell in the same horizontal plane. Both the crane mount base 18 and the body subframe 12 support the floor plate 11 of the truck. By incorporating the base 18 into the subframe body 12, the floor plate 11 may be positioned lower than in conventional models to provide greater loading capacity.

The crane tower 20 is positioned in the rear body compartment of the truck 10 and extends vertically inside the compartment to provide a rigid support for the crane. As shown in FIG. 1, the crane tower 20 is positioned on the curb side of the truck 10, but can also be positioned on the street side. The crane tower 20 includes a tower base plate 30 that is secured to a portion of the longitudinal members 22 and the top plate 26. It is preferred that the tower base plate 30 be flush with and dwelling in the same horizontal plane as the bottom of the floor plate 11. Extending vertically from the peripheral edge of the tower base plate 30 are a plurality of side panels 32. The side panels 32 create a hollow chamber 34 above the tower base plate that is enclosed by securing a mounting plate 36 to the top edge of the side panels 32. The mounting plate 36 has a centrally located aperture 38. A conventional crane 40 is mounted on the top surface of the mounting plate 36 and the crane controls (not shown) are threaded through the aperture 38 into the hollow chamber 34. It is preferred that the rearward side of the tower 20 remain open to provide access to the hollow chamber 34 and allow an operator to remove the controls from the chamber 34, particularly when the controls 42 are connected to the crane 40 with a pendant electrical umbilical cord. The side panels 32 of the crane tower 20 separate the crane 40 from the body subframe 12 such that the crane floats relative to the body and frees the body of crane loads.

In operation, when the crane 40 is mounted to the crane mount assembly 16, there is an initial bending load on the rearward portion of the crane mount base 18. The attachment of the longitudinal members 22 and transverse members 24 to the truck frame members 14, in combination with the torsion cell created by the top and bottom plates (26, 28) provides greater strength to resist bending forces and allows for a crane 40 with greater loading capacity to be mounted. When the crane 40 receives a load and rotates about its vertical axis, torsion forces are placed on the crane mount assembly 16 particularly when the load is at a 45° angle in relation to the center of the crane tower 20. The torsion cell created by the assembled crane mount base 18 spreads the torsional forces across the crane mount base and provides greater resistance to the torque placed upon the base, thus allowing for greater load capacity. For example, utilizing a torsion base that is approximately five inches in height between the floor plate 11 and the subframe 12 the crane mount assembly can absorb approximately 20,000 ft./lbs of torque before failure is reached. By contrast, a conventional crane assembly would require a seven to eight inch base to absorb the same torque, which reduces the cargo loading space, or would fail at approximately 12,000 ft./lbs of torque if a five inch base were used.

Accordingly, as can be seen from the preceding disclosure, the crane mount assembly meets its objectives by providing greater support strength for supporting larger loads.

The invention claimed is:

1. A crane mount assembly for mounting a mechanical device to a utility vehicle having frame members, a body subframe, and a floor plate, comprising:
   a torsion cell base securable to the vehicle frame members;
   a crane tower secured to and extending vertically from a portion of the torsion cell base;
   wherein the torsion cell base is comprised of a pair of longitudinal members in spaced alignment
   a plurality of transverse members extending between the longitudinal members;
   an uppermost plate secured between the longitudinal members and transverse members that extends horizontally to form an upper surface of the torsion cell base;
   a lowermost plate secured between the longitudnal members and transverse members that extends horizontally to form a bottom surface of the torsion cell base;
   wherein the uppermost plate is secured in parallel spaced relation to the lowermost plate; and
   wherein a top surface of the uppermost plate is located within a same horizontal plane as a top surface of the plurality of transverse members and a top surface of the pair of longitudinal members.

2. The crane mount assembly of claim 1 wherein the crane tower is further comprised of a base plate secured to the torsion cell base, a plurality of side panels that extend vertically from the base plate, and a mounting plate secured to a top edge of the side panels.

3. The crane mount assembly of claim 2 wherein the crane tower forms a hollow chamber.

4. The crane mount assembly of claim 3 wherein the crane tower has an open side.

5. The crane mount assembly of claim 2 wherein the mounting plate has a central aperture therethrough.

6. A utility truck having a crane mount assembly, truck frame members, a bed subframe, and a floor plate for mounting a mechanical device comprising:
   a crane mount base securable to the truck frame members and having a pair of longitudinal members in spaced alignment, a plurality of transverse members extending between the longitudinal members, and an uppermost plate secured between the longitudinal members and transverse members that extends horizontally to form a top surface of a torsion cell base, and a lowermost plate secured between the longitudinal members and transverse members that extends horizontally to form a bottom surface of the torsion cell base, wherein the uppermost plate is secured in parallel spaced relation to the lowermost plate, and wherein a top surface of the uppermost plate is located within a same horizontal plane as a top surface of the plurality of transverse members and a top surface of the pair of longitudinal members, and
   a crane tower secured to and extending vertically from a portion of the crane mount base and having a base plate secured to the crane mount base, a plurality of side panels that extend vertically from the base plate, and a mounting plate secured to a top edge of the side panels.

7. The crane mount assembly of claim 6 wherein the crane tower forms a hollow chamber.

8. The crane mount assembly of claim 7 wherein the crane tower has an open side.

9. The crane mount assembly of claim 6 wherein the mounting plate has a central aperture therethrough.

10. The utility truck of claim 6 wherein the base plate of the crane tower is secured to uppermost plate of the crane mount base, and the uppermost plate is located within a horizontal plane of a top of a bed subframe.

\* \* \* \* \*